United States Patent [19]

Barbary

[11] Patent Number: 5,785,000

[45] Date of Patent: Jul. 28, 1998

[54] KITTY LITTER ASSEMBLY

[76] Inventor: Daniel J. Barbary, 114 Chelsea St., Stratford, Conn. 06497

[21] Appl. No.: 897,062

[22] Filed: Jul. 18, 1997

[51] Int. Cl.⁶ ............................................. A01K 29/00
[52] U.S. Cl. ............................................. 119/166
[58] Field of Search ........................... 119/165, 166, 119/168

[56] References Cited

U.S. PATENT DOCUMENTS

| | | | |
|---|---|---|---|
| 3,100,474 | 8/1963 | Schneider | 119/166 |
| 3,482,546 | 12/1969 | Anderson | 119/166 |
| 5,499,610 | 3/1996 | Bruner et al. | 119/166 |
| 5,678,508 | 10/1997 | Butzen | 119/166 |

*Primary Examiner*—Thomas Price
*Attorney, Agent, or Firm*—Fattibene and Fattibene; Arthur T. Fattibene; Paul A. Fattibene

[57] ABSTRACT

A kitty litter assembly incorporating a waste disposal arrangement to facilitate the removal of the solid waste matter so as to permit the reuse of the litter. The assembly includes a stand on which a litter container is hingedly connected, and which container has an opening in one end thereof and an associated closure. A screen drawer is slidably mounted on the stand immediately below the litter container and above a collector which is stowed within the stand. Cleaning of the litter is effected simply by pulling out the screen drawer and tilting the litter container so that upon the opening of the associated closure, the litter, including the solid waste, are emptied onto the screen drawer whereby the waste is screened from the litter which passes through the screen and is received in the collector. The litter, free of the solid waste in the collector, is then returned to the litter container for reuse; and the waste collected by the screen drawer disposed of. In its simplest form, the litter assembly includes a container having a screened opening and an associated closure whereby the litter is screened by simply emptying the litter through the screen opening into a suitable collector and disposing of the solid waste remaining in the litter container.

6 Claims, 2 Drawing Sheets

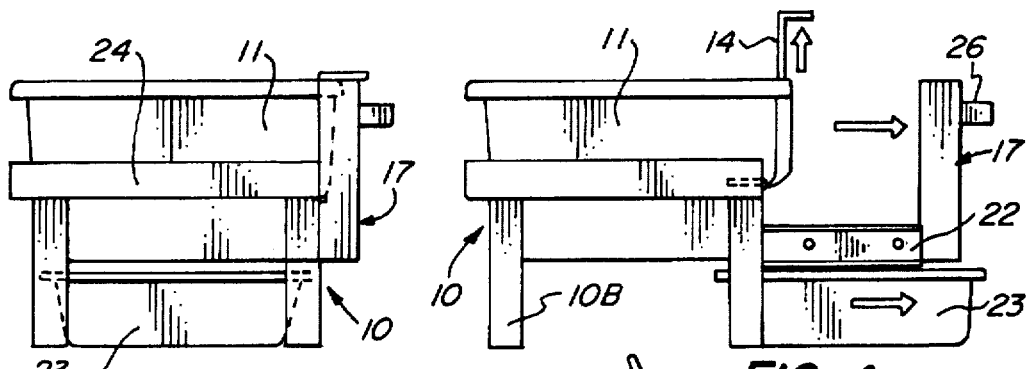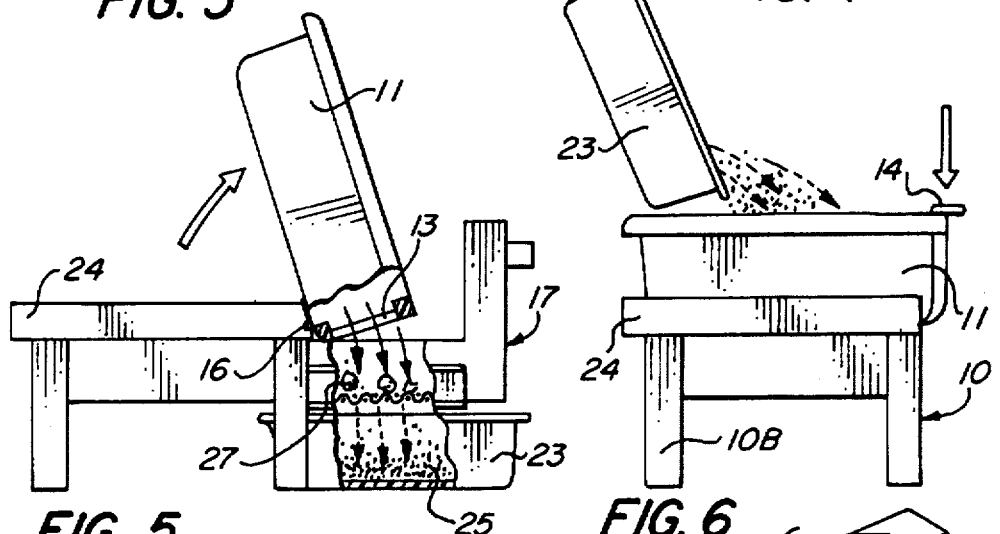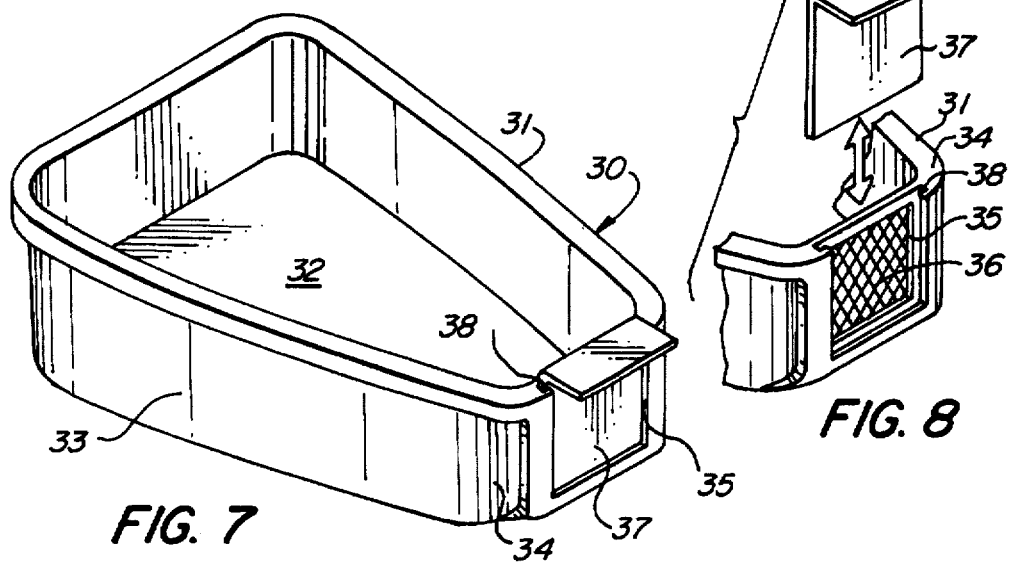

KITTY LITTER ASSEMBLY

FIELD OF THE INVENTION

This invention relates generally to a kitty litter, and more particularly to a kitty litter assembly or container constructed to facilitate the removal of the solid waste from the litter in a simple and convenient manner so as to permit reuse of the litter.

PROBLEM AND PRIOR ART

House pets, such as cats and kittens, are trained to relieve themselves in an area wherein a container is maintained which contains a supply of sand, sawdust and/or a commercial litter composition. As a result, such litter containers are required to be periodically cleaned. Generally, this has been accomplished by disposing of both the solid waste or feces and the litter material, and refilling the container with new, clean litter, or by scooping the solid waste out of the litter material with a sieve or perforated scoop. Numerous efforts have been made to provide kitty litter that are disposable and/or to provide arrangements that attempt to clean the kitty litter free of the accumulated waste. However, such known kitty litter assemblies are wasteful and/or are relatively complex and difficult to manufacture.

SUMMARY OF THE INVENTION

An object of this invention is to provide a kitty litter assembly to facilitate the separation of the solid waste from the litter so as to render the litter reuseable.

Another object is to provide a kitty litter assembly to effect the separation of the solid waste from the litter in a simple, expedient and sanitary manner.

Another object is to provide a kitty litter container which is relatively simple in construction, positive in operation and inexpensive to manufacture.

The foregoing objects, features and advantages are obtained by a kitty litter assembly which includes a stand upon which a litter box or container for containing a supply of kitty litter, e.g. sand or the like, is supported wherein one end of the container is hingedly connected to the stand for pivoting between an inoperative litter position and a tilted or dumping position. One end of the container is provided with an opening which is suitably sealed by a closure. Slidably mounted on the stand immediately below the container is a pull out screen drawer. Disposed below the screen drawer is a pull out collector which may be stowed within the stand in the inoperative or non-use position.

In operation, the litter container can be readily cleaned by pulling the screen drawer out from its stowed position within the stand, and positioning the collector beneath the opened screen drawer. The litter container, with the closure removed or in the open position, is tilted so that the litter and solid waste are emptied onto the opened screen drawer whereby the litter passes through the screen and is collected in the collector as the solid waste is retained in the screen drawer and subsequently disposed. The litter collected in the collector, free of the solid waste, is returned to the litter container for reuse.

In its simplest form, the kitty litter assembly includes a kitty litter container having a screened opening formed in one end thereof which is normally closed by a suitable closure. To separate the solid waste from the litter, the litter container closure is opened so that the litter may be emptied into a suitable collector as it flows through the screened opening. The solid waste, being unable to pass through the screen opening, is retained in the litter container and subsequently disposed in any suitable manner. The litter, free of the solid waste, is then returned to the kitty litter container for reuse.

IN THE DRAWINGS

FIG. 3 is a side view of the kitty litter assembly illustrated in its operative stowed position.

FIG. 4 is a side view of the kitty litter assembly of FIG. 3 in an intermediate cleaning position.

FIG. 5 is a side view of the kitty litter assembly of FIGS. 3 and 4 illustrating the components in a tilted or dumping position.

FIG. 6 is a side view of the kitty litter assembly illustrating the placing of the litter, free of the solid waste, back in the litter container.

FIG. 7 is a perspective view of a simplified modified embodiment.

FIG. 8 is a fragmentary perspective view of a detail of construction of the embodiment of FIG. 7.

DETAILED DESCRIPTION

Figure 1:
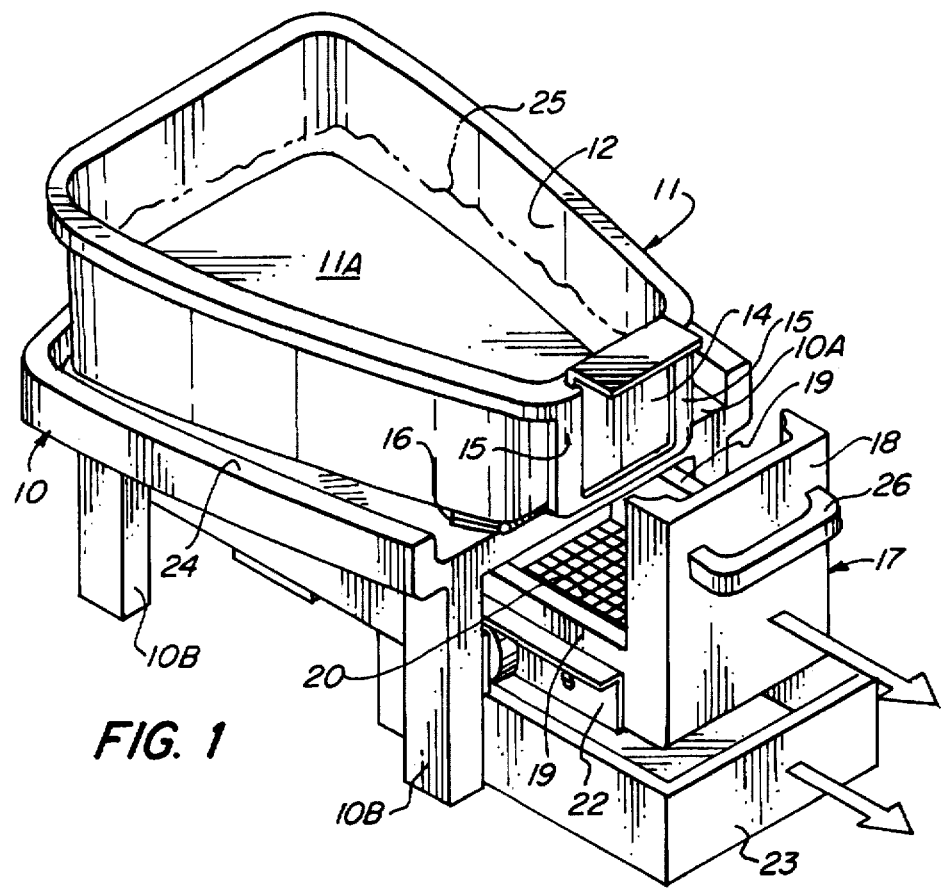
FIG. 1 is a perspective view of a kitty litter assembly embodying the invention.
Figure 2:
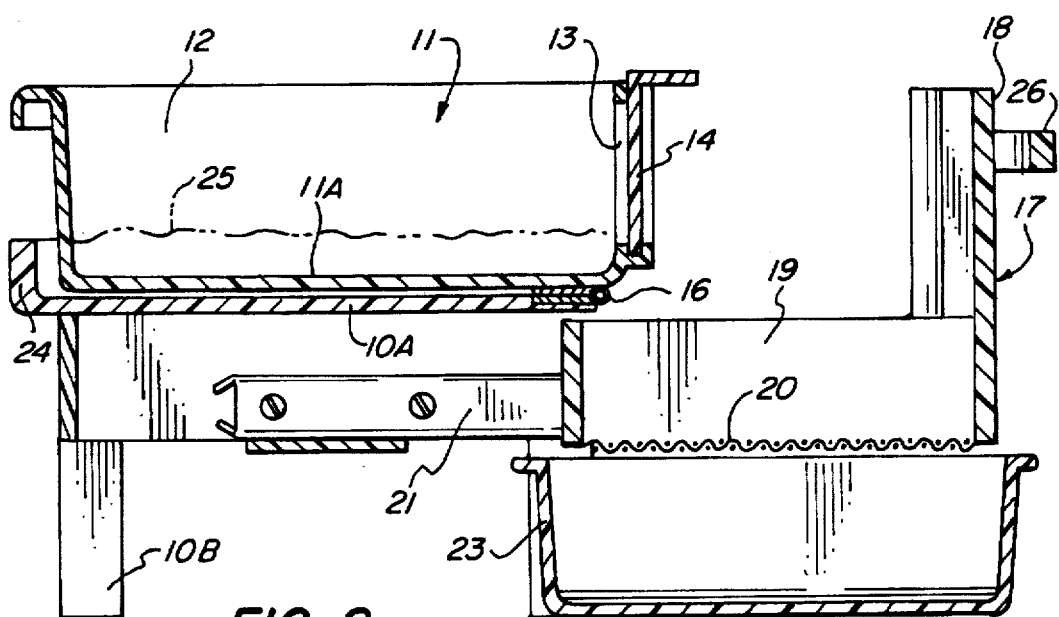
FIG. 2 is a side sectional view of the assembly of FIG. 1.

Referring to the drawings, the kitty litter assembly embodying the present invention comprises a stand 10 having a supporting surface 10A elevated on a plurality of supporting legs 10B. It will be understood that the height of the supporting surface is such that a cat or kitten can readily negotiate to reach the kitty litter container 11 supported on supporting surface 10A.

As shown, the kitty litter container 11 is provided with a generally flat bottom surface 11A and having circumscribing side walls 12 that taper inwardly toward one end thereof as illustrated in FIG. 1. The tapered or narrow end of the container 11 terminates in an end opening 13 which is readily sealed or closed by a door or closure 14.

In the illustrated embodiment, the door or closure 14 comprises a slidable member arranged to be slidably received between opposed rails 15—15, whereby the closure 14 can be shifted between a closed and open position; as illustrated in FIGS. 3 and 4 respectively.

In accordance with this invention, the litter container 11 is hingedly connected at the narrow or tapered end thereof by a foldable hinge 16. The arrangement is such that the litter container 11 can be readily tilted or rotated from its normal operative position as shown in FIGS. 1 and 3 to a tilted or rotated position as shown in FIG. 5 to effect the dumping of the kitty litter and any solid waste deposited therein by a cat or kitten, as will be hereinafter described.

Slidably mounted on the stand 10 immediately below the supporting surface is a screen drawer 17. The screen drawer includes a front face 18 which is connected to a pair of opposed horizontally extending side members 19—19 for supporting a screen 20 therebetween.

Mounted on the stand 10 below the surface 10A are a pair of opposed tracks 21 arranged to receive the guide rails 22 mounted on the respective side members 19—19 of the screen drawer 17. The arrangement is such that the screen drawer 17 is slidably mounted for movement between a stowed inoperative position as shown in FIG. 3 or an operative unstowed position as illustrated in FIG. 4. It will be understood that the mesh size of the openings in screen 20 are sufficiently large to permit the kitty litter material 25 to pass therethrough, while preventing the solid waste or feces from passing therethrough, as will be hereinafter described.

Arranged to be disposed below the screen bottom 20 of the screen drawer 17 is a collector or box 23 which is stowed thereunder as noted in FIG. 1 and 3 when the drawer is in either the stowed position as in FIG. 3 or in the operative position as in FIG. 4. In the illustrated embodiment, the collector 23 comprises simply a conventional open box configuration that can be readily stowed below the screen drawer 17 as seen in FIG. 3, until needed for use.

If desired, the supporting surface 10A is provided with an upwardly extending marginal wall 24 that circumscribes the litter container on at least three sides. Also, the front face 18 of the drawer 17 may be provided with a pull 26 to facilitate the shifting of the drawer 17 between operative and inoperative positions.

In operation, a supply of an appropriate kitty litter 25, e.g. sand, sawdust, or any of the commercial type litters, is placed into the container 11. When cleaning of the litter is required, the screen drawer is pulled out to its unstowed position as viewed in FIG. 4. Also, the collector or box 23 is positioned below the screen 20 as shown in FIG. 4. The closure 14 sealing the opening 13 of the litter container is shifted to its open position and the container 11 tilted or rotated about hinge 16 as noted in FIG. 5. In this position, the tapering sidewalls 12 of the container 11 funnels the kitty litter 25 and solid waste therein toward the opening 13 and is discharged onto the screen 20. As best seen in FIG. 5, the kitty litter 25 passes through the mesh openings of the screen and is collected in the collector or box 23. The solid waste or feces 27, being too large to pass through the screen, is retained on the screen 20. As the screen drawer 17 is readily removable from its stand 10, the solid waste or feces can be readily disposed, e.g. in a toilet or other suitable disposable bag or container. The litter 25, free of any solid waste collected in the collector 23, may be returned to the litter container 11 for reuse as indicated in FIG. 6; and wherein the process may be repeated as desired.

From the foregoing description, it will be noted that the described kitty litter assembly can be readily and easily cleaned without directly handling either the litter or the solid waste contained therein. The arrangement is such that the litter 25 can be readily recycled several times before replacement is required.

FIGS. 7 and 8 illustrate another embodiment of the invention in its simplest form. In this form, the kitty litter assembly 30 comprises a container 31 having a bottom wall 32 and circumscribing upright end walls 33, the side portions of which taper inward to define a narrowed end. Formed at the narrowed end 34 is an opening 35. Stretched across the opening 35 is a screen 36. Closing the opening 35 is a door or closure 37 which is slidably supported in opposed grooves or rails 38. From the foregoing description, it will be apparent that the door or closure 37 can be readily shifted between an open position or closed position.

In operation, a layer of suitable kitty litter is placed in the container 31 with the door or closure 37 in the closed position as in FIG. 7. When the kitty litter of FIG. 7 is to be cleaned, the door is shifted to an open position and the kitty litter dumped into a suitable collector, e.g. a box or collector 23, wherein the tapering walls 33 funnel the litter and any solid waste therein toward the opening 35. The litter having grain sizes, which are smaller than the mesh opening of the screen 36, passes therethrough and is collected in a suitable collector. The solid waste, being greater than the mesh openings of the screen 35, is retained in the container 31, whereby the retained waste is subsequently disposed, as hereinbefore set forth. After disposal of the solid waste, the closure 37 is returned to its closed position, and the litter, screened free of the solid waste, is returned to the container 31. The process can be repeated as often as desired.

It will be understood that the component parts of the kitty litter embodiments described can be formed of any suitable plastic material that can be readily washed and which are durable and light in weight. The respective embodiments allow the kitty litter to be screened and recycled in a simple and expedient manner with a minimum of effort and/or contamination. The embodiments described enables the kitty litter to be recycled and the waste material disposed of in an absolutely sanitary manner.

While the present invention has been described with respect to various embodiments, modifications and variations may be made without departing from the spirit or scope of this invention.

What is claimed is:

1. A kitty litter assembly comprising:

a stand having an elevated supporting surface, a litter container, adapted to contain a layer of litter, supported on said supporting surface, said container having an opening and a closure for sealing said opening, a hinge hingedly connecting said litter container to said supporting surface for pivoting between a normal litter position and an inclined dumping position, a screen drawer slidably mounted on said stand and below said supporting surface whereby said drawer is slidable between a stowed and unstowed position, and a collector stowed in said stand below said screen drawer, whereby said screen drawer and collector are shifted to their respective unstowed position for screening the litter from the solid waste contained therein so that the litter can be recycled.

2. A kitty litter assembly as defined in claim 1 wherein said litter container includes opposed upwardly extending sidewalls, and said sidewalls tapering inwardly toward said opening.

3. A kitty litter assembly as defined in claim 1 wherein said stand includes a plurality of leg members connected to said supporting surface, and a marginal wall circumscribing said supporting surface forming a seat for said litter container.

4. A kitty litter assembly as defined in claim 1 wherein said screen drawer comprises a front face, a pair of opposed side members connected to said front face, a screen extending between said side members, said screen having mesh openings sized to permit the kitty litter to pass therethrough, while prohibiting the solid waste from passing therethrough.

5. A kitty litter assembly as defined in claim 4 and including a track connected to said stand and complementary rail members connected to said drawer for slidably supporting said drawer relative to said stand.

6. A kitty litter assembly for facilitating the cleaning and recycling of the kitty litter material comprising:

a stand having a supporting surface and a plurality of legs for maintaining said surface in an elevated position, a container for receiving a layer of kitty litter material, said container having a bottom wall and connected circumscribing wall, said circumscribing wall including a pair of opposed wall portions that taper inwardly to define a narrow end, an opening formed in said narrow end, a closure sealing said opening, a hinge hingedly connecting said container to said supporting surface for pivoting between an operative kitty litter position and a tilted dumping position, a drawer having a screen bottom slidably supported on said stand and disposed below said supporting surface, said drawer being adapted to slide relative to said stand between an inoperative stowed position and an operative unstowed position, and a collector arranged to be stowed beneath said screen bottom of said drawer in the stowed and unstowed position of said drawer, and in the unstowed position of said drawer and associated collector, the separating of the solid waste from the kitty litter material is effect by tilting said container to a dumping position and discharging the contents thereof through said opening and onto said screen bottom of said drawer.

* * * * *